United States Patent
Lang et al.

(10) Patent No.: US 7,287,436 B2
(45) Date of Patent: Oct. 30, 2007

(54) ULTRASONIC MEASURING DEVICE INCLUDING A REFLECTION DEVICE

(75) Inventors: Tobias Lang, Stuttgart (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 11/304,007

(22) Filed: Dec. 14, 2005

(65) Prior Publication Data
US 2006/0156827 A1   Jul. 20, 2006

(30) Foreign Application Priority Data
Dec. 14, 2004   (DE) .................. 10 2004 060 063

(51) Int. Cl.
*G01F 1/66* (2006.01)
(52) U.S. Cl. .................................. 73/861.25
(58) Field of Classification Search .............. None
See application file for complete search history.

(56) References Cited

U.S. PATENT DOCUMENTS

| | | | | |
|---|---|---|---|---|
| 3,906,791 A | * | 9/1975 | Lynnworth | 73/861.29 |
| 4,754,650 A | * | 7/1988 | Smalling et al. | 73/861.28 |
| 6,418,796 B1 | * | 7/2002 | Baumoel | 73/861.28 |
| 6,854,339 B2 | * | 2/2005 | Moscaritolo et al. | 73/861.27 |
| 6,901,812 B2 | * | 6/2005 | Moscaritolo et al. | 73/861.27 |
| 2002/0178836 A1 | * | 12/2002 | Shinmura et al. | 73/862.29 |

FOREIGN PATENT DOCUMENTS

EP    0 477 418    4/1992

* cited by examiner

*Primary Examiner*—Harshad Patel
(74) *Attorney, Agent, or Firm*—Kenyon & Kenyon LLP

(57) ABSTRACT

An ultrasonic measuring device having at least one ultrasonic transducer, an analyzer circuit, and a reflection surface provided within a flow pipe for a gaseous medium. The first ultrasonic transducer and the second ultrasonic transducer are inclined toward one another, the electronic analyzer circuit being situated between the first ultrasonic transducer and the second ultrasonic transducer. The reflection surface of a reflection device is designed to be essentially convex on its side facing the ultrasonic transducers.

10 Claims, 3 Drawing Sheets

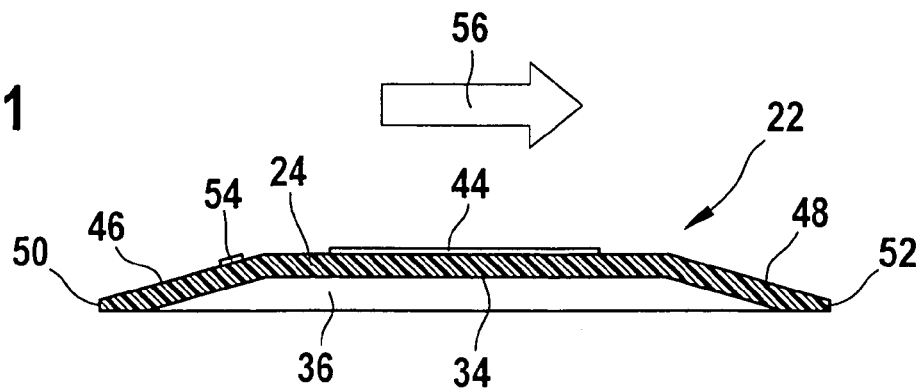
Fig. 4.1
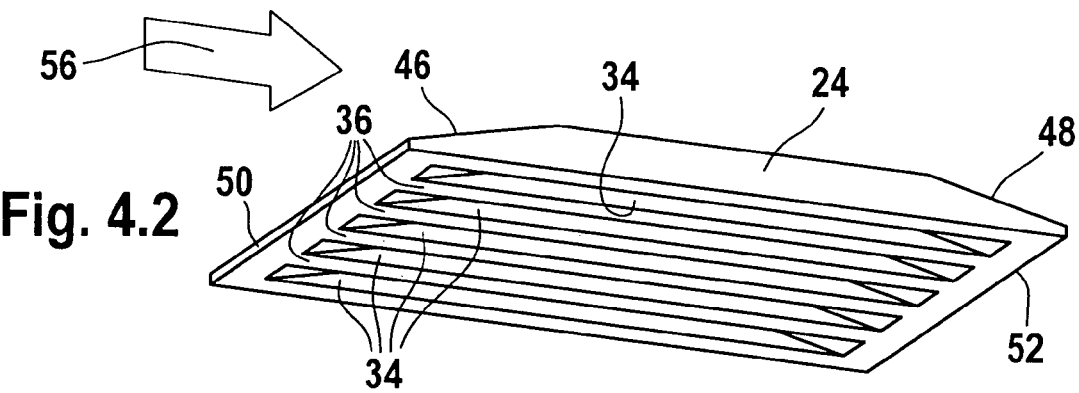
Fig. 4.2
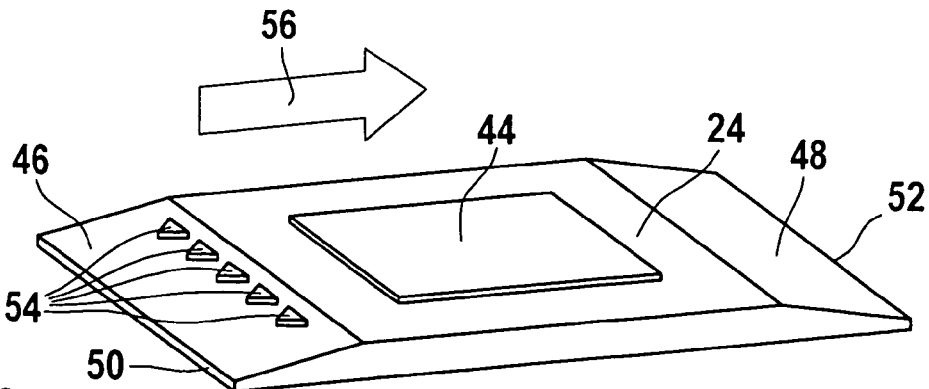
Fig. 4.3

ULTRASONIC MEASURING DEVICE INCLUDING A REFLECTION DEVICE

FIELD OF THE INVENTION

The measurement of the air mass flowing in the intake system of an internal combustion engine is necessary for the fill detection of cylinders. The air mass in the intake system of the internal combustion engine is determined using ultrasonic flow meter units which are assigned to an intake manifold for the combustion air of the internal combustion engine.

BACKGROUND INFORMATION

An ultrasonic (US) flow meter for installation into a measuring tube is described in European Patent Application No. EP 0 477 418 A1. The ultrasonic (US) flow meter for installation into a measuring tube is used for air-mass measurement in a motor vehicle engine. The unit includes two ultrasonic transducers which operate in alternation as transmission transducers or receive transducers as well as a reflector system for creating a reflection path passing through the measuring tube for ultrasonic waves between the particular ultrasonic transmission transducer and the particular ultrasonic receive transducer. A base plate/mounting plate is provided for accommodating the first ultrasonic transducer and the second ultrasonic transducer as well as the reflector system. Furthermore, the base plate/mounting plate is used for sealingly mounting the unit over a mounting hole for the unit. The first ultrasonic transducer and the second ultrasonic transducer are preferably placed symmetrically inclined toward one another and the reflector system at a predetermined angle. The reflector system is supported at a distance from the base plate/mounting plate within the measuring tube using a supporting construction in such a way that the reflector system within the measuring tube together with the ultrasonic transducers forms the reflection path necessary for flow measurement. On its side facing away from the measuring tube, the base plate/mounting plate preferably supports an electronic control unit and measuring unit between the two ultrasonic transducers. The reflector system preferably contains a single reflector body for forming a V-shaped reflection path. In addition, it is possible to design the reflector system in such a way that a W-shaped reflection path includes the transducer-side inside wall of the measuring tube diametrically opposed to the reflector body or the measuring tube-side surface of the base plate/mounting plate and that an at least low-reflecting auxiliary body made, for example, of felt is situated on the reflector body preferably centered between the beam axes of the ultrasonic transducers for avoiding an interfering reflection of scattered rays of the ultrasonic transmission transducer during the measurement. The reflector system may contain two reflector bodies for forming the W-shaped reflection path including the transducer-side inside wall of the measuring tube diametrically opposed to the reflector plane or the measuring tube-side surface of the base plate/mounting plate.

The supporting construction is manufactured from a rod assembly, the supporting construction being made up of a dish-shaped sheet metal construction open in the flow direction and the reflector system being situated on the bottom of the dish-shaped sheet metal construction. The side walls of the dish-shaped sheet metal construction have recesses for weight reduction and/or for the purpose of a gas or liquid exchange between the inside and outside of the dish-shaped sheet metal construction. The side walls may be formed or oriented in such a way that they may be used as a guide surface for flow harmonization and for forming a relevant partial current. Preferably, the dish-shaped sheet metal construction is of a one-piece design.

In other ultrasonic flow meter units known from the related art, a system of two ultrasonic transducers P1 and P2 is customarily used, which send ultrasonic waves to one another. The ultrasonic waves pass from one to the other transducer through the flowing medium at propagation times $t_1$ and $t_2$. The difference between propagation times in the flow direction, propagation time $t_1$, and against the flow, propagation time $t_2$, represents a measure of the flow rate of the medium to be measured.

SUMMARY OF THE INVENTION

An ultrasonic measuring device for measuring a flow medium is provided, which includes a reflection device, which is connected to at least two ultrasonic transducers and one analyzer circuit, is combined in an insertion sensor, the surface used for reflecting the ultrasonic waves having an essentially convex curvature pointing to the ultrasonic transducers. The system according to the present invention may be used to reduce turbulences in the area between the reflection surface and the ultrasonic transducers, resulting in a more precise detection of the flow of the flowing medium.

The side of the reflection device facing the ultrasonic transducers of the ultrasonic measuring device is essentially convex due to chamfers provided on the leading and trailing edges. The chamfers produce a local flow acceleration which reduces flow separations between the reflection device and the ultrasonic transducers as well as within a recess. At least in the area of the actual ultrasonic reflection, the surface of the reflection device, i.e., the reflection surface, may be provided with a coating having better reflection properties than the material of the remaining reflection surface such as, for example, in the area of the chamfers provided on the leading and trailing edges.

The back of the reflection surface used as a reflection device is preferably provided with cored out areas in order to reduce the material thickness and also to stiffen the reflection device mechanically. The cored out areas on the back of the reflection surface used as a reflection device preferably extend in the flow direction. In combination with the chamfers on the leading and trailing edges of the reflection device, this results in a more favorable flow guidance. The cored out areas on the back of the reflection surface include webs which separate the cored out areas from one another and stabilize the reflection surface. The cored out areas are used advantageously to reduce the weight of the reflection surface used as a reflection device, which in particular results in the reflection device having a greater strength under mechanical loads occurring in motor vehicles in particular. In addition to the fact that the cored out areas essentially extend in the flow direction and accordingly stabilize the flow, it is possible to achieve a further flow stabilization due to the fact that in the area of the leading edge, multiple recesses separated from one another are provided close to the leading edge. These recesses separated from one another close to the leading edge cause a turbulator effect because longitudinal eddies that essentially occur there result in the flow being essentially in closer contact with the reflection surface used as a reflection device.

BRIEF DESCRIPTION OF THE DRAWINGS

FIGS. 4.1, 4.2 and 4.3 show a side view, a perspective view from below, and a reflected perspective view from above of the reflection surface used as a reflection device.

DETAILED DESCRIPTION

Figure 1:
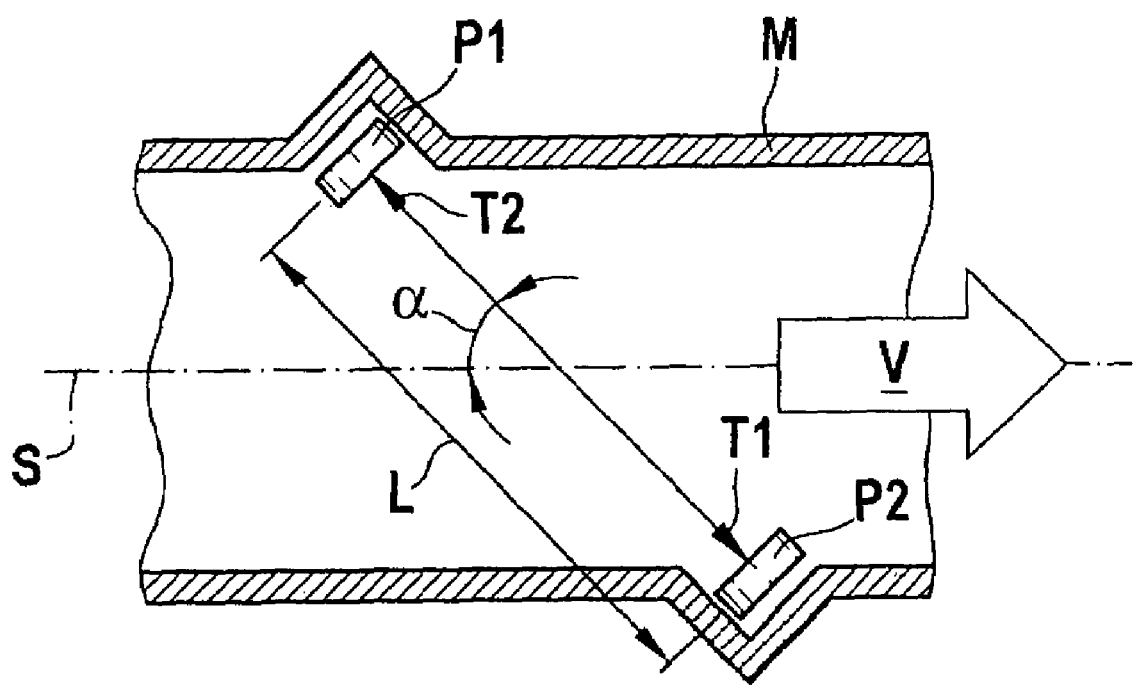
FIG. 1 shows a basic structure known from the related art for an ultrasonic flow meter having diagonally diametrically opposed transducer elements.

FIG. 1 shows an ultrasonic flow meter system known from the related art in which the ultrasonic transducers are embedded into the walls of a measuring tube. The depiction in FIG. 1 makes it evident that a first ultrasonic transducer P1 and a second ultrasonic transducer P2 are situated in recesses in the side walls of a measuring tube. Ultrasonic transducers P1 and P2 face one another and are spaced from one another at a distance L. A medium flows through the measuring tube in the direction of the arrow denoted as V. The measuring tube is symmetrical to the axis of symmetry. The angle of inclination at which first ultrasonic transducer P1 is situated in relation to second ultrasonic transducer P2 is identified as α.

The system known from FIG. 1 makes it possible to measure the propagation times of ultrasonic waves from first ultrasonic transducer P1 to second ultrasonic transducer P2 and in the opposite direction. The propagation time of an ultrasonic wave from transducer P1 in transmit mode to ultrasonic transducer P2 in receive mode, i.e., in flow direction V of the gaseous medium, is shorter compared to propagation time T2 from second ultrasonic transducer P2 to first ultrasonic transducer P1 opposite the flow direction of the gaseous medium indicated by the arrow denoted as V. The flow rate of the gaseous medium flowing in the measuring tube, in the case of an internal combustion engine the air flow flowing through the measuring tube, is inferred from the propagation time difference between T1 and T2. A system of this type, as shown in FIG. 1, is used to ascertain the air mass volume for detecting the cylinder filling of one cylinder or multiple cylinders of a multicylinder internal combustion engine.

Figure 2:
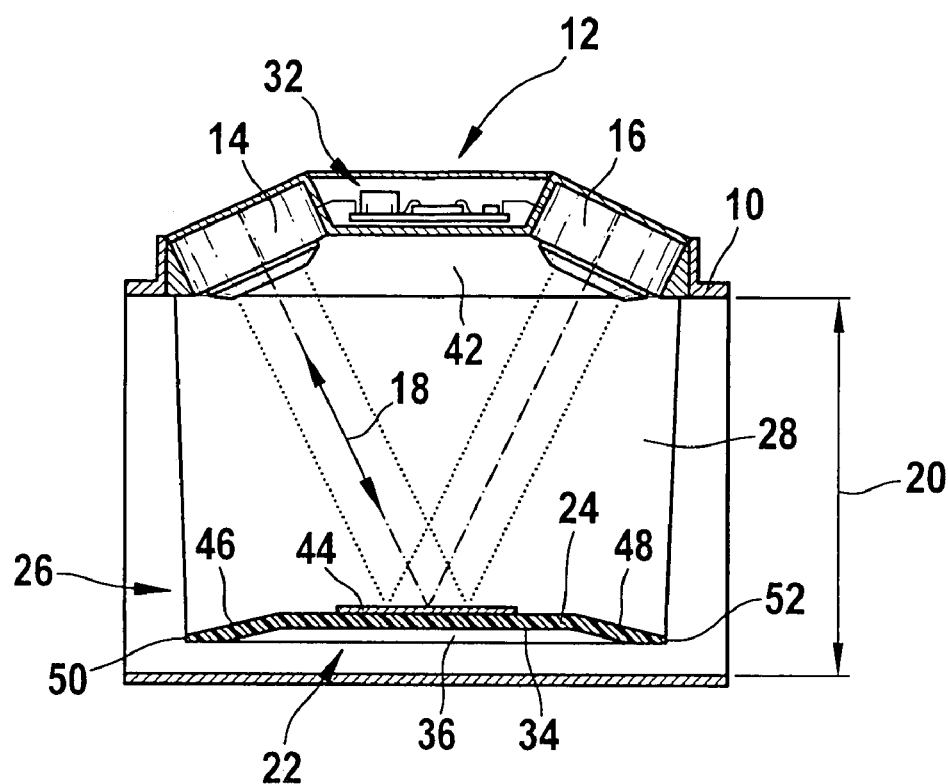
FIG. 2 shows an ultrasonic flow sensor designed as an insertion sensor having an aerodynamically shaped reflection surface.

FIG. 2 shows a side view of an ultrasonic flow meter unit of the present invention situated upstream including an assigned reflection device.

According to the depiction in FIG. 2, an insertion sensor 12 is embedded into a flow pipe 10. A first ultrasonic transducer 14 and a second ultrasonic transducer 16 are integrated into insertion sensor 12. Via first ultrasonic transducer 14, it is possible, for example, to send ultrasonic signals 18 which are reflected on a reflection surface 24 of a reflection device 22 to second ultrasonic transducer 16. Of course, it is also possible to transmit ultrasonic signals 18 to first ultrasonic transducer 14 via second ultrasonic transducer 16 and reflection surface 24; operation is possible in both directions.

Reflection device 22 is embedded into a flow cross-section 20 of flow pipe 10. The reflection device has a mount 26 which may be but is not necessarily a part of insertion sensor 12. Mount 26 includes a first side wall 28 and a second side wall 30. For the sake of clarity, only first side wall 28 is depicted in FIG. 2; second side wall 30 has been omitted from FIG. 2 to make it possible to show a sectional view of reflection surface 24.

Insertion sensor 12, into which mount 26 may be integrated, includes an analyzer circuit 32 which controls the operation of first ultrasonic transducer 14 and second ultrasonic transducer 16 with respect to the operating mode transmit/receive of ultrasonic signals 18 and which analyzes the received signals. A recess 42 is located below analyzer circuit 32 in insertion sensor 12. Flow separations of the gaseous medium, whose flow rate is to be determined by the ultrasonic measuring device and which flows through open flow cross-section 20 of measuring tube 10, preferably form at recess 42 in the upper area of insertion sensor 12. Recess 42 represents a widening of the cross section in which flow separations may occur, which may result in signal interference or measuring errors. However, recess 42 is necessary because the flow must be directed obliquely so that one component of the sound wave path is in the flow direction. This results in the oblique installation position of ultrasonic transducers 14, 16 as shown in FIG. 2. The physical size of ultrasonic transducers 14, 16 is a function of the selected ultrasonic frequency, which determines the size of the transducer and an installation angle of the transducer, which in turn influence the dimensioning of recess 42.

Reflection surface 24 is shown as a section in the lower area of mount 26 as depicted in FIG. 2. As depicted in FIG. 2, reflection surface 24 of reflection device 22 is provided with a coating 44. Coating 44 on the surface of reflection surface 24 makes it possible to produce an improved reflection at least in the area of the actual reflection of ultrasonic signals 18. Coating 44 is preferably selected from a material having better reflection properties than the material of the rest of reflection surface 24. As a result, reflection surface 24, which may be the integral component of mount 26, may be produced from an economical material while the actual reflection of ultrasonic signals 18 is performed by an inlay of a coating 44 or a cemented-on coating 44 from a material having better reflection properties than reflection surface 24. Reflection surface 24 of reflection device 22 includes a first chamfer 46 formed on one leading edge 50 and a second chamfer 48 formed on one trailing edge 52. First chamfer 46 formed in reflection surface 24 of reflection device 22 and second chamfer 48 in the area of trailing edge 52 causes reflection surface 24 on the side facing first ultrasonic transducer 14 and second ultrasonic transducer 16 to have an essentially convex shape.

In the context of the present application, a reflection surface 24 is understood to be a reflection surface having an essentially convex shape, the central section of reflection surface 24 being provided with preferably flat coating 44, the preferably flat central sections being adjoined by first chamfer 46 in the direction of leading edge 50 and by second chamfer 48 in the direction of trailing edge 52. First chamfer 46 and second chamfer 48 may be designed as inclined planes as is evident from FIG. 2. However, it is also possible to provide the surface of first chamfer 46 and second chamfer 48 with a slight curvature extending from leading edge 50 and trailing edge 52 to the flat central section and smoothly merging into this flat section.

This gives rise to a local flow acceleration which reduces the separation of the flow of the gaseous medium between reflection surface 24 and ultrasonic transducers 14, 16 as well as within recess 42. The back of reflection surface 24 of reflection device 22 is provided with cored out areas 34. As a function of the width of flow cross-section 20 and of reflection surface 24, multiple cored out areas 34 are provided perpendicular to the projection plane according to FIG. 2 and to the bottom of reflection surface 24. Individual cored out areas 34 are separated from one another by webs or ribs 36 and extend from leading edge 50 of reflection surface 24 in the flow direction to trailing edge 52 on the bottom of reflection surface 24. Cored out areas 34 reduce the material thickness of reflection surface 24, which is associated with a weight reduction. Webs 36 provided between cored out areas 34 stiffen reflection surface 24 in order to lastingly withstand the vibrations occurring during the operation of an internal combustion engine, including the intake system. The design of cored out areas 34 on the bottom of reflection surface 24 in the flow direction from leading edge 50 to trailing edge 52 is further associated with the advantage that it is possible to achieve a more favorable flow guidance in the area of reflection surface 24.

Figure 3:
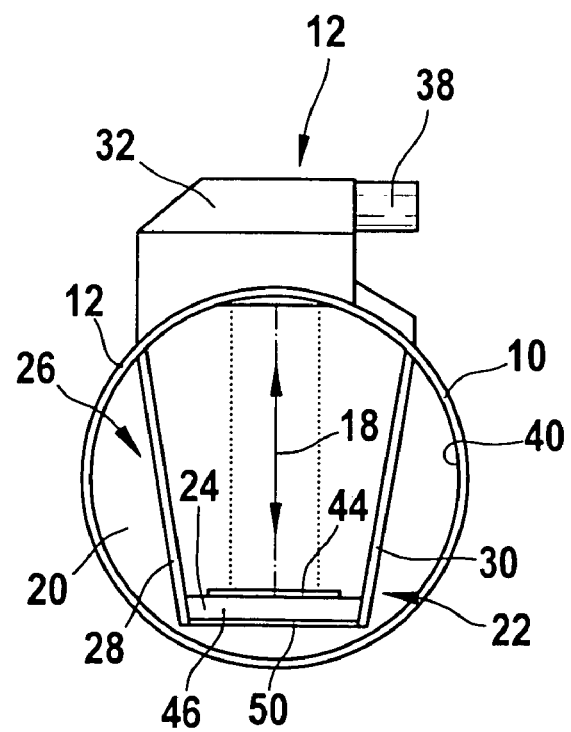
FIG. 3 shows a view of the ultrasonic flow sensor rotated 90°, installed in a measuring tube.

FIG. 3 depicts the ultrasonic measuring device according to FIG. 2 rotated by 90°.

Insertion sensor 12 is integrated into the top of flow pipe 10 for reasons of easier accessibility. Analyzer circuit 32 integrated into the top of insertion sensor 12 is closed by a covering flap on which an electrical terminal 38 is formed. Via electrical terminal 38, the signals analyzed by analyzer circuit 32 of insertion sensor 12 are, for example, transmitted via a CAN bus or via other signal transmission leads to a central engine control unit (not shown in FIG. 3) of an internal combustion engine.

First side wall 28 and mount 26 extend from inside wall 40 of flow pipe 10, their ends facing away from analyzer circuit 32 and being connected to one another by reflection surface 24. Ultrasonic signals 18 are emitted in a vertical direction and reflected by either reflection-enhancing coating 44 integrated into the top of reflection surface 24 or by a coating 44 cemented to or vapor-deposited on the top of reflection surface 24. FIG. 3 further shows leading edge 50, which is adjoined by the beveled edge of first chamfer 46 of reflection surface 24. Ribs or webs 36 formed on the bottom of reflection surface 24 as depicted in FIG. 2 and cored out areas 34 delimited by them, which preferably extend in the flow direction, are not shown in FIG. 3 for the sake of clarity.

Several views of the reflection surface of the reflection device can be seen in the sequence of FIGS. 4.1 through 4.3.

The depiction in FIG. 4.1 shows that the bottom of reflection surface 24 of reflection device 22 has cored out areas 34 from leading edge 50 in flow direction 56 to trailing edge 52. Cored out areas 34 on the bottom of reflection surface 24 are separated from one another by webs or ribs 36. Cored out areas 34 make it possible to reduce the weight of reflection surface 24, which, for example, may be made from a plastic material. Reflection surface 24 is connected to insertion sensor 12 by side walls 28 and 30 of a mount 26, which are not shown in FIG. 4.1. Side walls 28 and 30 of reflection device 22 may be components of insertion sensor 12; however, they may also be attached to side wall 40 of flow pipe 10 as separate components. The depiction according to FIG. 4.1 shows first chamfer 46 on leading edge 50 and second chamfer 48 in the area of trailing edge 52 in an enlarged scale. As depicted in FIG. 4.1, coating 44 is cemented or adhesively attached in another manner to the top surface of reflection surface 24, ultrasonic signals 18 emitted by first ultrasonic transducer 14 and by second ultrasonic transducer 16 being reflected onto coating 44. Coating 44 preferably has better reflection properties than the material from which reflection surface 24 of reflection device 22 is made. First side wall 28, second side wall 30 of mount 26, as well as reflection surface 24 connecting side walls 28, 30 may be manufactured as integral components of insertion sensor 12 using the plastic injection molding method in a manner which is advantageous in particular. A correspondingly dimensioned opening on the top of measuring tube (flow pipe) 10 enables an insertion sensor to be sealingly embedded into the provided opening.

FIG. 4.2 shows a perspective view of the reflection surface of the reflection device from below.

FIG. 4.2 shows that multiple cored out areas 34 are formed on the bottom of reflection surface 24. Individual cored out areas 36 preferably extend in flow direction 56 from leading edge 50 to trailing edge 52 of reflection surface 24. For the sake of completeness, it should be mentioned that in the perspective view from below according to FIG. 4.2, first chamfer 46 and second chamfer 48 are formed on the top of reflection surface 24, imparting an essentially convex shape to the top of reflection surface 24. Cored out areas 34 extending preferably in the flow direction are separated from one another by individual ribs or webs 36. Webs or ribs 36 may be used to stiffen, i.e., stabilize, reflection surface 24 of the reflection device. Cored out areas 34 in turn make it possible to reduce the weight of reflection surface 24, which, with respect to the mechanical stresses during vibrations of the internal combustion engine, results in greater strength of this component. On the bottom of reflection surface 24, the longitudinal extension of cored out areas 36 makes it possible to stabilize the flow of the flowing medium.

FIG. 4.3 shows a perspective top view of the essentially convex top of reflection surface 24.

The depiction in FIG. 4.3 shows that multiple turbulators 54 are situated in the area of first chamfer 46 downstream from leading edge 50. Turbulators 54 make it possible to stabilize the flow in the vicinity of leading edge 50. Turbulators 54, which may, for example, have a triangular shape, make it possible to generate essentially longitudinal eddies which result in the flow having better contact with convexly curved reflection surface 24.

With regard to the design of turbulators 54, the selection of a triangular shape has proven to be favorable in particular. In principle, however, turbulators 54 may have any periodical, comb-like structure which produces a positive effect on the flow. In addition to a triangular shape, it is thus possible for turbulators 54 to be designed as cuboids, trapezoids, as rhomboids or even to be partially rounded off.

Advantageously, turbulators 54 placed directly on leading edge 50 may also be used. Teeth situated on trailing edge 52 have had a similarly favorable effect. Furthermore, reflection surface 24 may also be given the shape of an airfoil profile. In this case, only one part of the surface is designed in such a way that the sound is reflected back directionally. In the normal case, this is a surface which is as flat as possible within the wing profile, i.e., starting downstream from leading edge 50 and ending upstream from trailing edge 52.

LIST OF REFERENCE NUMERALS

P1 1. Ultrasonic transducer
P2 2. Ultrasonic transducer
α Angle of inclination
L Distance P1-P2
V Flowing Medium
M Measuring tube
S Axis of symmetry
10 Flow pipe
12 Insertion sensor
14 1$^{st}$ Ultrasonic transducer
16 2$^{nd}$ Ultrasonic transducer
18 Ultrasonic signals
20 Flow cross section 22 Reflection device
24 Reflection surface
26 Mount
28 1$^{st}$ Side wall
30 2$^{nd}$ Side wall
32 Analyzer circuit
34 Cored out area
36 Web/rib
38 Electrical connection
40 Inside wall of flow pipe
42 Recess
44 Coating
46 1$^{st}$ Chamfer
48 2$^{nd}$ Chamfer
50 Leading edge
52 Trailing edge
54 Turbulators
56 Flow direction of gaseous medium

What is claimed is:

1. An ultrasonic measuring device comprising:
    a first ultrasonic transducer and a second ultrasonic transducer inclined toward one another;
    an analyzer circuit situated between the first ultrasonic transducer and the second ultrasonic transducer;
    a reflection device situated within a flow pipe for a gaseous medium, the reflection device having a reflection surface which is substantially convex on a side facing the ultrasonic transducers, the reflection surface having a first chamfer in an area of a leading edge and a second chamfer in an area of a trailing edge; and
    turbulators situated in an area of the first chamfer in the reflection surface.

2. The ultrasonic measuring device according to claim 1, wherein the reflection surface has a first chamfer in an area of a leading edge and a second chamfer in an area of a trailing edge.

3. The ultrasonic measuring device according to claim 1, wherein the reflection device, including a first side wall, the reflection surface and a second side wall, is an integral component of an insertion sensor to be sealingly attached to the flow pipe.

4. The ultrasonic measuring device according to claim 1, wherein the reflection surface has a coating which promotes ultrasonic reflection.

5. The ultrasonic measuring device according to claim 1, wherein a backside of the reflection surface has at least one cored out area.

6. The ultrasonic measuring device according to claim 5, wherein the at least one cored out area extends in a flow direction of the gaseous medium on the backside of the reflection surface.

7. The ultrasonic measuring device according to claim 5, wherein the at least one cored out area includes a plurality of cored out areas on the backside of the reflection surface separated from one another by one of (a) webs and (b) ribs.

8. The ultrasonic measuring device according to claim 1, wherein the turbulators include at least one of (a) recesses and (b) indentations within the first chamfer of the reflection surface.

9. The ultrasonic measuring device according to claim 1, wherein the turbulators one of (a) are triangular in form and (b) have a periodic, comb-like structure cross-wise to a flow direction of the gaseous medium.

10. The ultrasonic measuring device according to claim 1, wherein the reflection surface has a profile in a shape of an airfoil, including a substantially flat surface extending between one leading edge and one trailing edge seen in a flow direction of the gaseous medium.

* * * * *